(12) United States Patent
Fan et al.

(10) Patent No.: US 12,063,669 B2
(45) Date of Patent: Aug. 13, 2024

(54) INFORMATION DETERMINING METHOD AND APPARATUS

(71) Applicant: HUAWEI TECHNOLOGIES CO., LTD., Guangdong (CN)

(72) Inventors: Bo Fan, Chengdu (CN); Xi Zhang, Ottawa (CA); Liuliu Ji, Shanghai (CN); Peng Guan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 523 days.

(21) Appl. No.: 17/217,859

(22) Filed: Mar. 30, 2021

(65) Prior Publication Data

US 2021/0219302 A1 Jul. 15, 2021

Related U.S. Application Data

(63) Continuation of application No. PCT/CN2020/109009, filed on Aug. 13, 2020.

(30) Foreign Application Priority Data

Aug. 14, 2019 (CN) .......................... 201910748550.4

(51) Int. Cl.
*H04W 72/53* (2023.01)
*H04L 1/00* (2006.01)
*H04L 5/00* (2006.01)
*H04W 72/0446* (2023.01)
*H04W 72/23* (2023.01)

(52) U.S. Cl.
CPC ........... *H04W 72/53* (2023.01); *H04L 1/0004* (2013.01); *H04L 5/0051* (2013.01); *H04W 72/0446* (2013.01); *H04W 72/23* (2023.01)

(58) Field of Classification Search
CPC . H04W 72/53; H04W 72/23; H04W 72/0446; H04L 1/0004; H04L 5/0051
See application file for complete search history.

(56) References Cited

U.S. PATENT DOCUMENTS

2012/0314667 A1 12/2012 Taoka et al.
2019/0149365 A1 5/2019 Chatterjee et al.
2020/0367208 A1* 11/2020 Khoshnevisan ...... H04L 5/0048

FOREIGN PATENT DOCUMENTS

| CN | 103825638 A | 5/2014 |
| CN | 109587793 A | 4/2019 |
| WO | 2019143900 A1 | 7/2019 |

OTHER PUBLICATIONS

Khoshnevisan, PDSCH/PUSCH Repetition Enhancements for URLLC, May 14, 2019.*

(Continued)

*Primary Examiner* — Justin Y Lee
(74) *Attorney, Agent, or Firm* — Fish & Richardson P.C.

(57) ABSTRACT

This application discloses an information determining method and an apparatus, the information determining method includes: receiving second indication information from a network device; and determining, based on a plurality of parameters indicated by the second indication information, a transmission manner of transmitting same data by using a plurality of transmission configuration indicator states (TCI-states), wherein the plurality of parameters comprise at least a quantity of TCI-states and a quantity of consecutive transmissions of the same data.

8 Claims, 4 Drawing Sheets

(56) References Cited

OTHER PUBLICATIONS

Office Action issued in Chinese Application No. 201910748550.4, dated Jul. 27, 2021, 6 pages (With Partial English Translation).
Huawei, HiSilicon, "Reliability/robustness enhancement with multi-TRP/panel," 3GPP TSG RAN WG1 meeting #97, R1-1906039, Reno, USA, May 13-17, 2019, 10 pages.
Huawei, HiSilicon, "Enhancements on multi-TRP/panel transmission," 3GPP TSG RAN WG1 Ad-Hoc Meeting 1901, R1-1900017, Taipei, Jan. 21-25, 2019, 15 pages.
3GPP TS 38.331 V15.6.0 (Jun. 2019), "3rd Generation Partnership Project; Technical Specification Group Radio Access Network; NR; Radio Resource Control (RRC) protocol specification (Release 15)," Jun. 2019, 519 pages.
Huawei, HiSilicon, "Summary of AI: 7.2.8.2 Enhancements on Multi-TRP/Panel Transmission of Offline Discussion," 3GPP TSG RAN WG1 Meeting #97, R1-1907706, Reno, USA, May 13-17, 2019, 66 pages.
3GPP TS 38.214 V15.6.0 (Jun. 2019), "3rd Generation Partnership Project; Technical Specification Group Radio Access Network; NR; Physical layer procedures for data (Release 15)," Jun. 2019, 105 pages.
3GPP TS 38.211 V15.6.0 (Jun. 2019), "3rd Generation Partnership Project; Technical Specification Group Radio Access Network; NR; Physical channels and modulation (Release 15)," Jun. 2019, 97 pages.
3GPP TS 38.212 V15.6.0 (Jun. 2019), "3rd Generation Partnership Project; Technical Specification Group Radio Access Network; NR; Multiplexing and channel coding (Release 15)," Jun. 2019, 101 pages.
3GPP TS 38.213 V15.6.0 (Jun. 2019), "3rd Generation Partnership Project; Technical Specification Group Radio Access Network; NR; Physical layer procedures for control (Release 15)," Jun. 2019, 107 pages.
PCT International Search Report and Written Opinion in International Application No. PCT/CN2020/109009, dated Nov. 13, 2020, 12 pages.
Ericsson, "On multi-TRP and multi-panel," 3GPP TSG RAN WG1 Meeting Ad-Hoc Meeting 1901, R1-1900728, Taipei, Taiwan, Jan. 21-25, 2019, 9 pages.
Extended European Search Report issued in European Application No. 20852662.4 on Nov. 26, 2021, 9 pages.
Huawei, HiSilicon, "Enhancements on Multi-TRP/panel transmission," 3GPPTSG RAN WG1#97, R1-1906029, Reno, USA, May 13-17, 2019, 17 pages.

* cited by examiner

INFORMATION DETERMINING METHOD AND APPARATUS

CROSS-REFERENCE TO RELATED APPLICATIONS

This application is a continuation of International Application No. PCT/CN2020/109009, filed on Aug. 13, 2020, which claims priority to Chinese Patent Application 201910748550.4, filed on Aug. 14, 2019. The disclosures of the aforementioned applications are hereby incorporated by reference in their entireties.

TECHNICAL FIELD

This application relates to the communications field, and in particular, to an information determining method and an apparatus.

BACKGROUND

A 5th generation (5G) mobile communications system may support three service types: enhanced mobile broadband (eMBB), ultra-reliable low latency communication (uRLLC), and massive machine-type communications (mMTC). The uRLLC requires ultra-high transmission reliability and an ultra-low transmission latency. To meet a reliability requirement of the uRLLC, a network device may simultaneously transmit different redundancy versions (RV) of same data to a terminal device by using a plurality of transmission reception points (TRP), so that data transmission reliability can be greatly improved.

When the network device transmits same data to the terminal device by using two TRPs, used frequency domain resources, RVs, and modulation and coding schemes (MCS) may be different. In the prior art, the network device sends parameters such as the frequency domain resources, the RVs, and the MCSs used by the two TRPs, to the terminal device by using two messages. On one hand, overheads of time-frequency resources are increased. On the other hand, calculation complexity and energy consumption of the terminal device are increased.

SUMMARY

Embodiments of this application provide an information determining method and an apparatus, so that when a network device indicates parameters such as frequency domain resources, RVs, and MCSs used by two TRPs, overheads of time-frequency resources are not increased.

To achieve the foregoing objective, the following technical solutions are used in the embodiments of this application:

According to a first aspect, an information determining method is provided. The information determining method includes: receiving first indication information, second indication information, and downlink control information (DCI) from a network device, where the first indication information is used to indicate a maximum quantity of codewords that can be scheduled by one piece of DCI, and the second indication information is used to indicate a data transmission manner; and if it is determined, based on the first indication information, that a first condition is satisfied, and it is determined, based on the second indication information, that a second condition is satisfied, determining, in the DCI, a first group of transmission parameter fields corresponding to first data and a second group of transmission parameter fields corresponding to second data, where the first group of transmission parameter fields include a modulation and coding scheme (MCS) field, a new data indicator (NDI) field, and a redundancy version (RV) field that are of the first data, and the second group of transmission parameter fields include an MCS field, an NDI field, and an RV field that are of the second data; and the MCS field of the second data is used or the MCS field and the NDI field of the second data are used to indicate one or a combination of the following information: a modulation order used for the second data, a bit rate used for the second data, and frequency resource information of the second data.

According to the information determining method provided in this embodiment of this application, when the network device indicates parameters such as frequency domain resources, RVs, and MCSs used by two TRPs, the MCS field, the NDI field, and the RV field that are of the first data are still indicated in the first group of transmission parameter fields in the DCI. The MCS field and the NDI field of the second data are multiplexed in the second group of transmission parameter fields in the DCI, to indicate one or a combination of the following information: one of the modulation order or the bit rate used for the second data and the frequency resource information of the second data. Transmission parameters such as the modulation order, the bit rate, and the NDI that are used for the second data and that are not indicated in the second group of transmission parameter fields in the DCI use same transmission parameters of the first data. A quantity of pieces of the DCI does not need to be increased or a new DCI field does not need to be introduced, so that when the network device indicates the parameters such as the frequency domain resources, the RVs, and the MCSs that are used by the two TRPs, overheads of time-frequency resources are not increased.

In a possible implementation, the first condition includes: the maximum quantity of codewords that can be scheduled by one piece of DCI is 2.

In a possible implementation, the second condition includes: the network device separately sends, on different frequency domain resources, two codewords corresponding to same data.

In a possible implementation, the method further includes: if it is determined, based on the first indication information, that the first condition is satisfied, and it is determined, based on the second indication information, that the second condition is not satisfied, determining that the first group of transmission parameter fields and the second group of transmission parameter fields that are in the DCI respectively correspond to two different transport blocks.

In a possible implementation, the frequency resource information includes one or a combination of the following: a frequency domain resource offset, a granularity of the frequency domain resource offset, a frequency domain resource quantity difference, a granularity of the frequency domain resource quantity difference, and a frequency domain resource allocation type.

In a possible implementation, the NDI field of the second data is used to indicate at least one of the granularity of the frequency domain resource offset, the granularity of the frequency domain resource quantity difference, and the frequency domain resource allocation type.

In a possible implementation, the frequency domain resource offset is: an offset from a start location of a frequency domain resource of the second data to an end location of a frequency domain resource of the first data; or an offset from a start location of a frequency domain resource of the second data to a start location of a frequency domain resource of the first data; or an offset from an end location of a frequency domain resource of the second data to an end location of a frequency domain resource of the first data; or an offset from an end location of a frequency domain resource of the second data to a start location of a frequency domain resource of the first data; or an offset from a start location of a frequency domain resource of the first data to an end location of a frequency domain resource of the second data; or an offset from a start location of a frequency domain resource of the first data to a start location of a frequency domain resource of the second data; or an offset from an end location of a frequency domain resource of the first data to an end location of a frequency domain resource of the second data; or an offset from an end location of a frequency domain resource of the first data to a start location of a frequency domain resource of the second data. A specific meaning of the frequency domain resource offset is not limited in this application.

In a possible implementation, the granularity of the frequency domain resource offset or the granularity of the frequency domain resource quantity difference is a resource element (RE), a resource block (RB), a resource block group (RBG), a precoding resource block group (PRG), or a subband. The granularity of the frequency domain resource offset or the granularity of the frequency domain resource quantity difference is not limited in this application.

In a possible implementation, the frequency domain resource quantity difference is a difference obtained by subtracting a frequency domain resource quantity of the second data from a frequency domain resource quantity of the first data, or a difference obtained by subtracting a frequency domain resource quantity of the first data from a frequency domain resource quantity of the second data.

In a possible implementation, the frequency domain resource offset or the frequency domain resource quantity difference is indicated by using radio resource control (RRC) signaling, media access control control element (MAC-CE) signaling, or DCI signaling, or uses a default value or uses a value reported by the terminal device.

In a possible implementation, the bit rate of the second data is the same as that of the first data, and the modulation order of the second data is indicated by using the MCS field, or the MCS field and the NDI field in the second group of transmission parameter fields. In other words, for the MCS field or the MCS field and the NDI field in the second group of transmission parameter fields, some bits are multiplexed to transmit the modulation order used for the second data and the frequency resource information of the second data. It is considered by default that the bit rate for the second data is the same as that of the first data.

In a possible implementation, the modulation order of the second data is the same as that of the first data, and the bit rate of the second data is indicated by using the MCS field, or the MCS field and the NDI field in the second group of transmission parameter fields. In other words, for the MCS field or the MCS field and the NDI field in the second group of transmission parameter fields, some bits are multiplexed to transmit the bit rate used for the second data and the frequency resource information of the second data. It is considered by default that the modulation order used for the second data is the same as that of the first data.

In a possible implementation, the second data uses new data indication information indicated by the NDI field in the first group of transmission parameter fields. In other words, when the NDI field in the second group of transmission parameter fields is multiplexed, the new data indication information of the second data is the same as the new data indication information of the first data.

In a possible implementation, the first data and the second data may be any one of the following: two codewords, two RVs, data corresponding to two transmission configuration indicator states (TCI-states), data corresponding to two demodulation reference signal (DMRS) ports or port groups, data corresponding to two DMRS port code division multiplexing (CDM) groups, and data transmitted by using two TRPs.

In a possible implementation, the frequency domain resource of the first data and the frequency domain resource of the second data each are a segment of continuous frequency domain resources, and the two segments of continuous frequency domain resources do not overlap; or the frequency domain resource quantity used by the first data is the same as or different from the frequency domain resource quantity used by the second data; or the two segments of frequency domain resources are connected or are spaced by a specific quantity of frequency domain resources.

According to a second aspect, an information determining method is provided. The information determining method includes: determining first indication information, second indication information, and downlink control information (DCI), where the first indication information is used to indicate a maximum quantity of codewords that can be scheduled by one piece of DCI, and the second indication information is used to indicate a data transmission manner; and if the first indication information indicates that the first condition is satisfied, and the second indication information indicates that a second condition is satisfied, the DCI includes a first group of transmission parameter fields corresponding to first data and a second group of transmission parameter fields corresponding to second data, where the first group of transmission parameter fields include a modulation and coding scheme (MCS) field, a new data indicator (NDI) field, and a redundancy version (RV) field that are of the first data, and the second group of transmission parameter fields include an MCS field, an NDI field, and an RV field that are of the second data; and the MCS field of the second data is used or the MCS field and the NDI field of the second data are used to indicate one or a combination of the following information: one of a modulation order or a bit rate used for the second data, and frequency resource information of the second data; and sending the first indication information, the second indication information, and the DCI to a terminal device.

According to the information determining method provided in this embodiment of this application, when a network device indicates parameters such as frequency domain resources, RVs, and MCSs used by two TRPs, the MCS field, the NDI field, and the RV field that are of the first data are still indicated in the first group of transmission parameter fields in the DCI. The MCS field and the NDI field of the second data are multiplexed in the second group of transmission parameter fields in the DCI, to indicate one or a combination of the following information: one of the modulation order or the bit rate used for the second data and the frequency resource information of the second data. Transmission parameters such as the modulation order, the bit rate, and the NDI that are used for the second data and that are not indicated in the second group of transmission parameter fields in the DCI use same transmission parameters of the first data. A quantity of pieces of the DCI does not need to be increased or a new DCI field does not need to be introduced, so that when the network device indicates the parameters such as the frequency domain resources, the RVs, and the MCSs that are used by the two TRPs, overheads of time-frequency resources are not increased.

In a possible implementation, the first condition includes: the maximum quantity of codewords that can be scheduled by one piece of DCI is 2.

In a possible implementation, the second condition includes: the second indication information indicates the network device to separately send, on different frequency domain resources, two codewords corresponding to same data.

In a possible implementation, the method further includes: if it is determined, based on the first indication information, that the first condition is satisfied, and it is determined, based on the second indication information, that the second condition is not satisfied, determining that the first group of transmission parameter fields and the second group of transmission parameter fields that are in the DCI respectively correspond to two different transport blocks.

In a possible implementation, the frequency resource information includes one or a combination of the following: a frequency domain resource offset, a granularity of the frequency domain resource offset, a frequency domain resource quantity difference, a granularity of the frequency domain resource quantity difference, and a frequency domain resource allocation type.

In a possible implementation, the NDI field of the second data is used to indicate at least one of the granularity of the frequency domain resource offset, the granularity of the frequency domain resource quantity difference, and the frequency domain resource allocation type.

In a possible implementation, the frequency domain resource offset is: an offset from a start location of a frequency domain resource of the second data to an end location of a frequency domain resource of the first data; or an offset from a start location of a frequency domain resource of the second data to a start location of a frequency domain resource of the first data; or an offset from an end location of a frequency domain resource of the second data to an end location of a frequency domain resource of the first data; or an offset from an end location of a frequency domain resource of the second data to a start location of a frequency domain resource of the first data; or an offset from a start location of a frequency domain resource of the first data to an end location of a frequency domain resource of the second data; or an offset from a start location of a frequency domain resource of the first data to a start location of a frequency domain resource of the second data; or an offset from an end location of a frequency domain resource of the first data to an end location of a frequency domain resource of the second data; or an offset from an end location of a frequency domain resource of the first data to a start location of a frequency domain resource of the second data. A specific meaning of the frequency domain resource offset is not limited in this application.

In a possible implementation, the granularity of the frequency domain resource offset or the granularity of the frequency domain resource quantity difference is a resource element RE, a resource block (RB), a resource block group (RBG), a precoding resource block group (PRG), or a subband. The granularity of the frequency domain resource offset or the granularity of the frequency domain resource quantity difference is not limited in this application.

In a possible implementation, the frequency domain resource quantity difference is a difference obtained by subtracting a frequency domain resource quantity of the second data from a frequency domain resource quantity of the first data, or a difference obtained by subtracting a frequency domain resource quantity of the first data from a frequency domain resource quantity of the second data.

In a possible implementation, the frequency domain resource offset or the frequency domain resource quantity difference is indicated by using radio resource control (RRC) signaling, media access control control element (MAC-CE) signaling, or DCI signaling, or uses a default value or uses a value reported by the terminal device.

In a possible implementation, the bit rate of the second data is the same as that of the first data, and the modulation order is indicated by using the MCS field, or the MCS field and the NDI field in the second group of transmission parameter fields. In other words, for the MCS field or the MCS field and the NDI field in the second group of transmission parameter fields, some bits are multiplexed to transmit the modulation order used for the second data and the frequency resource information of the second data. It is considered by default that the bit rate for the second data is the same as that of the first data.

In a possible implementation, the modulation order of the second data is the same as that of the first data, and the bit rate is indicated by using the MCS field, or the MCS field and the NDI field in the second group of transmission parameter fields. In other words, for the MCS field or the MCS field and the NDI field in the second group of transmission parameter fields, some bits are multiplexed to transmit the bit rate used for the second data and the frequency resource information of the second data. It is considered by default that the modulation order used for the second data is the same as that of the first data.

In a possible implementation, the second data uses new data indication information indicated by the NDI field in the first group of transmission parameter fields. In other words, when the NDI field in the second group of transmission parameter fields is multiplexed, the new data indication information of the second data is the same as the new data indication information of the first data.

In a possible implementation, the first data and the second data may be any one of the following: two codewords, two RVs, data corresponding to two TCI-states, data corresponding to two demodulation reference signal (DMRS) ports or port groups, data corresponding to two DMRS port code division multiplexing (CDM) groups, and data transmitted by using two TRPs.

In a possible implementation, the frequency domain resource of the first data and the frequency domain resource of the second data each are a segment of continuous frequency domain resources, and the two segments of continuous frequency domain resources do not overlap; or the frequency domain resource quantity used by the first data is the same as or different from the frequency domain resource quantity used by the second data; or the two segments of frequency domain resources are connected or are spaced by a specific quantity of frequency domain resources.

According to a third aspect, a terminal device is provided. The terminal device includes: a processing module and a transceiver module. The processing module and the transceiver module are configured to perform the method according to any one of the first aspect or the possible implementations of the first aspect, or perform the method according to any one of the second aspect or the possible implementations of the second aspect.

According to a fourth aspect, a network device is provided. The network device includes: a processing module and a transceiver module. The processing module and the transceiver module are configured to perform the method according to any one of the first aspect or the possible implementations of the first aspect, or perform the method according to any one of the second aspect or the possible implementations of the second aspect.

According to a fifth aspect, a communications apparatus is provided. The communications apparatus includes: a processor, a memory, and a transceiver. The processor is coupled to the memory, and when the processor executes a computer program or an instruction in the memory, the method according to any one of the first aspect or the possible implementations of the first aspect, or the method according to any one of the second aspect or the possible implementations of the second aspect is performed.

According to a sixth aspect, a chip is provided. The chip includes: a processor and an interface, configured to: invoke a computer program stored in a memory from the memory, and run the computer program, to perform the method according to any one of the first aspect and the possible implementations of the first aspect, or perform the method according to any one of the second aspect and the possible implementations of the second aspect.

According to a seventh aspect, a computer-readable storage medium is provided. The computer-readable storage medium stores an instruction. When the instruction is run on a computer or a processor, the computer or the processor is enabled to perform the information determining method according to any one of the first aspect or the possible implementations of the first aspect, or perform the information determining method according to any one of the second aspect or the possible implementations of the second aspect.

According to an eighth aspect, a computer program product including an instruction is provided. When the instruction is run on a computer or a processor, the computer or the processor is enabled to perform the information determining method according to any one of the first aspect or the possible implementations of the first aspect, or perform the information determining method according to any one of the second aspect or the possible implementations of the second aspect.

According to a ninth aspect, a communications system is provided. The communications system includes the terminal device according to the third aspect and the network device according to the fourth aspect.

For technical effects of the third aspect to the ninth aspect, refer to the content described in the possible implementations of the first aspect and the second aspect.

DESCRIPTION OF EMBODIMENTS

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that: With evolution of the network architecture and emergence of new service scenarios, the technical solutions provided in the embodiments of this application are also applicable to similar technical problems.

The embodiments of this application may be used in a time division duplexing (TDD) scenario, or may be used in a frequency division duplexing (FDD) scenario.

The embodiments of this application are described based on a 5G network scenario in a wireless communications network. It should be noted that, the solutions in the embodiments of this application may also be used in another wireless communications network, and a corresponding name may be replaced with a corresponding function name in the another wireless communications network.

Figure 1:
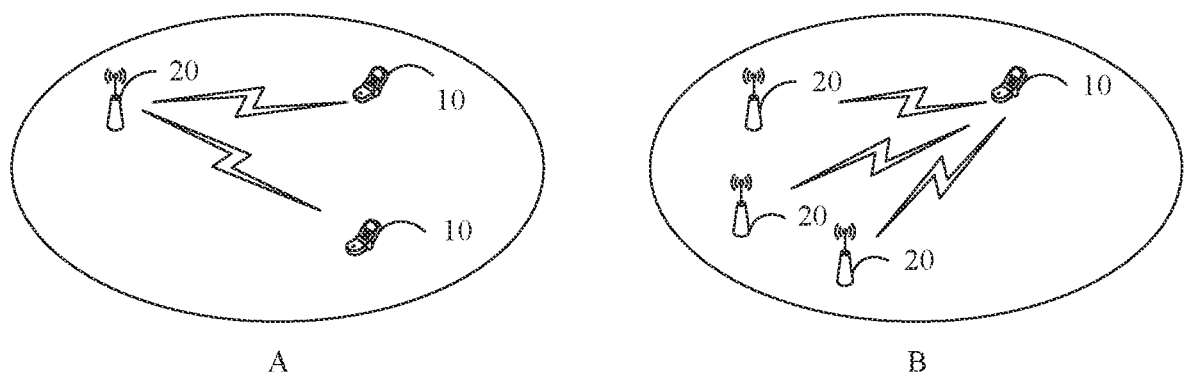
FIG. 1 is a schematic architectural diagram of a communications system according to an embodiment of this application.

A communications system to which this application is applied is shown in FIG. 1, and includes one or more terminal devices 10 and one or more network devices 20. As shown in A in FIG. 1, one network device 20 may transmit data or control signaling to one or more terminal devices 10. As shown in B in FIG. 1, a plurality of network devices 20 may also simultaneously transmit data or control signaling to one terminal device 10.

In the embodiments of this application, a network device (including a TRP) is an apparatus that is deployed in a radio access network to provide a wireless communication function for a terminal device. The network device may include a macro base station, a micro base station (also referred to as a small cell), a relay node, an access point, and the like in various forms. In systems using different radio access technologies, a name of the network device may be different. For example, the network device is referred to as a base transceiver station (BTS) in a global system for mobile communications (GSM) network or a code division multiple access (CDMA) network, a NodeB (NB) in a wideband code division multiple access (WCDMA) network, or an eNB or an eNodeB (NodeB) in a long term evolution (LTE) network. The network device may alternatively be a radio controller in a cloud radio access network (CRAN) scenario. The network device may alternatively be a base station device in a 5G network or a network device in a future evolved public land mobile network (PLMN) network. Alternatively, the network device may be a wearable device or a vehicle-mounted device.

In the embodiments of this application, a plurality of TRPs are used to transmit data to the terminal device. Therefore, the network device may be these TRPs, or may be an entirety formed by these TRPs and devices at another network end. Generally, each TRP performs transmission by using one transmission configuration indicator-state (TCI-state). It may be considered that one TCI-state corresponds to one TRP. Therefore, in this application, the TCI-state and the TRP may be replaced with each other.

The terminal device in the embodiments of this application may include various handheld devices, vehicle-mounted devices, wearable devices, or computing devices that have a wireless communication function, or other processing devices connected to a wireless modem. The terminal may be a mobile station (MS), a subscriber unit, a cellular phone, a smartphone, a wireless data card, a personal digital assistant (PDA) computer, a tablet computer, a wireless modem, a handset, a laptop computer, a machine type communication (MTC) terminal, or the like.

Communication between each network device and each terminal device in the communications system shown in FIG. 1 may alternatively be represented in another form.

Figure 2:
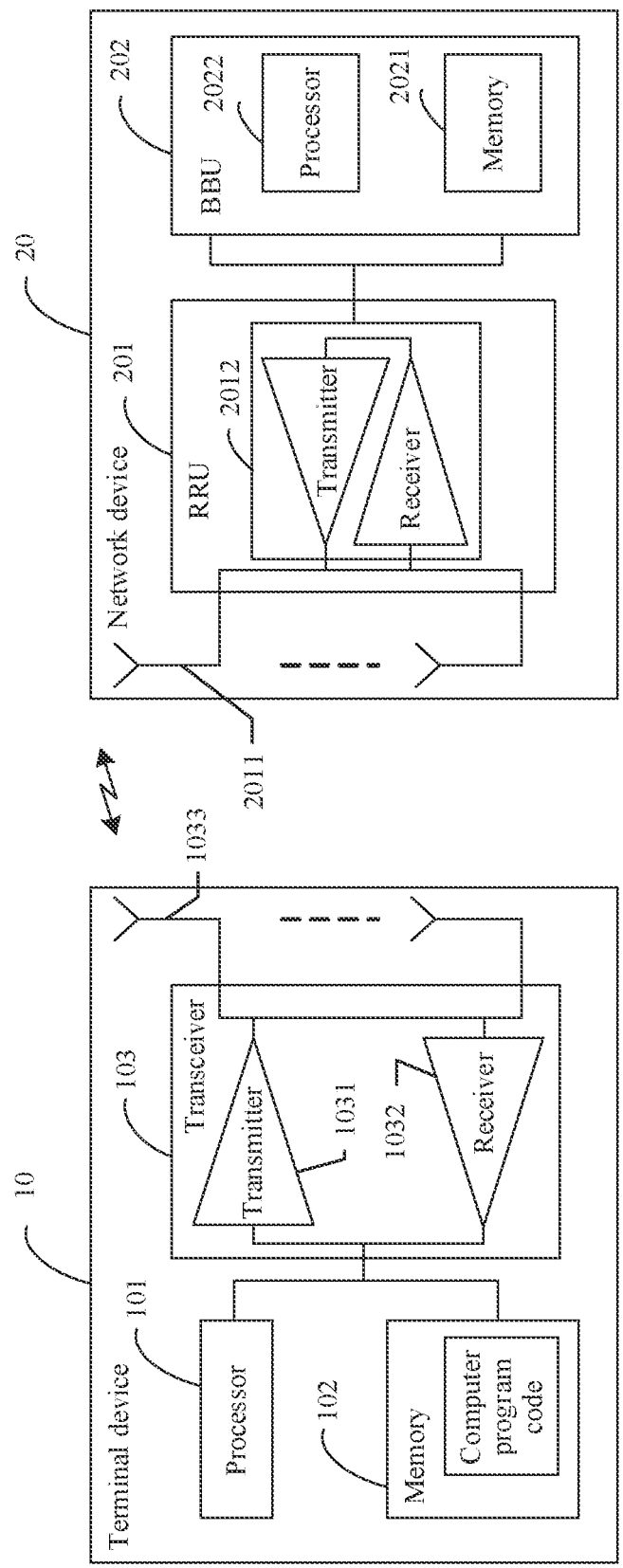
FIG. 2 is a schematic structural diagram of a terminal device and a network device according to an embodiment of this application.

As shown in FIG. 2, the terminal device 10 includes a processor 101, a memory 102, and a transceiver 103. The processor 101, the transceiver 103, and the memory 102 may communicate with each other by using an internal connection path, to transfer a control signal and/or a data signal. The memory 102 is configured to store a computer program, and the processor 101 is configured to: invoke the computer program from the memory 102 and run the computer program, to control the transceiver 103 to receive or send a signal. The transceiver 103 includes a transmitter 1031, a receiver 1032, and an antenna 1033. The receiver 1032 may be configured to receive transmission control information by using the antenna 1033, and the transmitter 1031 may be configured to send information to the network device 20 by using the antenna 1033.

As shown in FIG. 2, the network device 20 may include one or more radio frequency units, for example, a remote radio unit (RRU) 201 and one or more baseband units (BBU) which may also be referred to as digital units (DU) 202. The RRU 201 may be referred to as a transceiver unit. Optionally, the RRU 201 may also be referred to as a transceiver machine, a transceiver circuit, a transceiver, or the like, and may include at least one antenna 2011 and a radio frequency unit 2012. Optionally, the transceiver unit may include a receiving unit and a sending unit. The receiving unit may correspond to a receiver (or referred to as a receiving machine or a receiving circuit), and the sending unit may correspond to a transmitter (or referred to as a transmitting machine or a transmitting circuit). The RRU 201 part is mainly configured to: receive or send a radio frequency signal, and perform conversion between a radio frequency signal and a baseband signal. For example, the RRU 201 is configured to send indication information to the terminal device. The BBU 202 part is mainly configured to perform baseband processing, control the network device, and the like. The RRU 201 and the BBU 202 may be physically disposed together, or may be physically separated, that is, in a distributed base station.

The BBU 202 is a control center of the network device, may also be referred to as a processing unit, and is mainly configured to complete baseband processing functions such as channel coding, multiplexing, modulation, and spectrum spreading. For example, the BBU may be configured to control the network device to perform an operation procedure and the like related to the network device in a method embodiment of this application.

In an example, the BBU 202 may include one or more boards, and a plurality of boards may jointly support a radio access network (for example, an LTE network) having a single access standard, or may separately support radio access networks (for example, LTE networks, 5G networks, or other networks) having different access standards. The BBU 202 further includes a memory 2021 and a processor 2022. The memory 2021 is configured to store a necessary instruction and necessary data. The processor 2022 is configured to control the network device to perform a necessary action, and for example, is configured to control the network device to perform operation procedures related to the network device in the method embodiment of this application. The memory 2021 and the processor 2022 may serve the one or more boards. In other words, a memory and a processor may be separately disposed on each board. Alternatively, a plurality of boards may share a same memory and a same processor. In addition, a necessary circuit may be further disposed on each board.

In addition, the network device is not limited to being in the foregoing forms, and may also be in another form. For example, the network device includes a BBU and an adaptive radio unit (ARU), or includes a BBU and an active antenna unit (AAU), or may be customer-premises equipment (CPE), or may be in another form. This is not limited in this application.

An embodiment of this application provides an information determining method. Parameters such as frequency domain resources, RVs, and MCSs that are used by a network device to transmit data by using two TRPs are indicated by using an existing field in DCI, and overheads of time-frequency resources are not increased. Alternatively, in other words, an existing field in DCI is used to indicate parameters such as frequency domain resources, RVs, and MCSs that are used by a network device to transmit data by using two TCI-states. This does not increase overheads of time-frequency resources.

Figure 3:
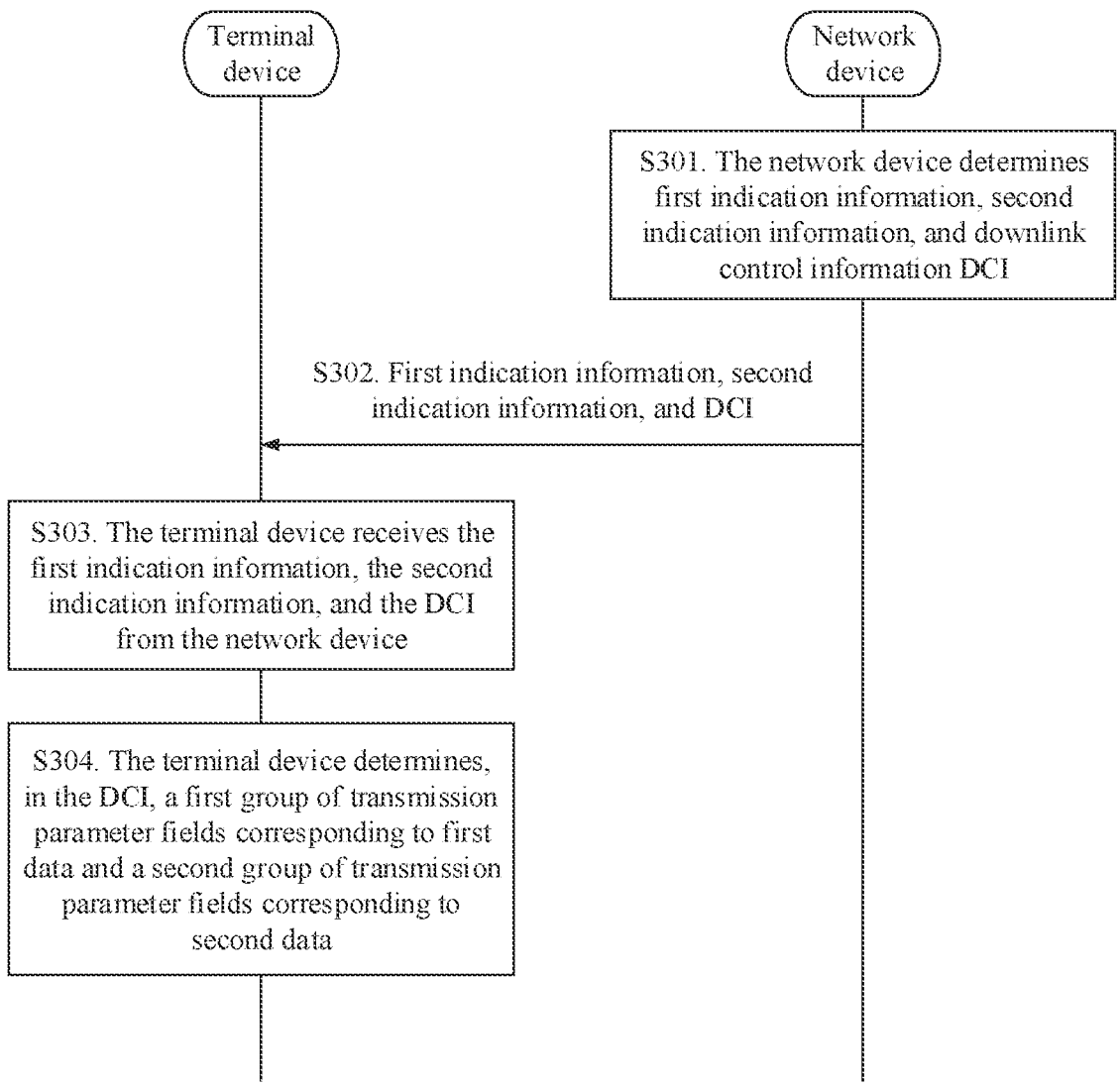
FIG. 3 is a schematic flowchart of an information determining method according to an embodiment of this application.

As shown in FIG. 3, the information determining method includes steps S301 to S304.

S301. A network device determines first indication information, second indication information, and downlink control information (DCI).

This step may alternatively be performed by a chip or a chip system in the network device. It should be noted that this step is not necessarily performed explicitly.

First, the first indication information and the second indication information are described.

The first indication information is used to indicate a maximum quantity of codewords that can be scheduled by one piece of DCI, and the first indication information may be represented by a parameter maxNrofCodeWordsScheduledByDCI. However, a naming manner of the parameter is not limited in this application. The maximum quantity of codewords that can be scheduled by one piece of DCI may be 1 or 2.

The second indication information is used to indicate a data transmission manner (for example, a repetition pattern). The data transmission manner may include the following manners:

Manner 1: In a same time unit, the network device separately sends an RV on a same frequency domain resource by using different TCI-states. These RVs are same RVs generated based on same data, and correspond to a same codeword. Each TCI-state corresponds to k (k$>=$1) demodulation reference signal (DMRS) ports.

Manner 2: In a same time unit, the network device separately sends an RV on different frequency domain resources by using different TCI-states. These RVs may be same RVs generated based on same data, or may be different RVs generated based on same data. These RVs may all correspond to a same codeword, or may respectively correspond to different codewords. Depending on whether these RVs correspond to a same codeword or different codewords, Manner 2 may be further divided into the following two manners (Manner 2-1 and Manner 2-2).

Manner 2-1: In a same time unit, the network device separately sends an RV on different frequency domain resources by using different TCI-states. These RVs are same RVs generated based on same data, and all RVs correspond to one codeword.

Manner 2-2: In a same time unit, the network device separately sends an RV on different time-frequency resources by using different TCI-states. These RVs are same RVs or different RVs generated based on same data, and each RV corresponds to one codeword.

Manner 3: In a plurality of continuous time units, the network device separately sends an RV by using a plurality of TCI-states. These RVs are same RV or different RVs generated based on same data.

The time unit may be a symbol, a slot, a subframe, a frame, or a time unit of another granularity. A terminal device may report, by using capability reporting signaling, whether any one of the foregoing data transmission manners is supported.

The second indication information may indicate the data transmission manners in the following manners:

In a possible implementation, the second indication information may include a parameter, used to indicate one of the foregoing manners.

For example, the second indication information includes one field, and four different values of the field respectively correspond to the foregoing four manners: Manner 1, Manner 2-1, Manner 2-2, and Manner 3.

For example, the second indication information includes one field, and three different values of the field respectively correspond to Manner 1, Manner 2, and Manner 3.

When the second indication information indicates Manner 2, whether Manner 2-1 or Manner 2-2 is specifically used is further determined based on the maximum quantity of codewords that can be scheduled by one piece of DCI and that is indicated by the first indication information. For example, if the second indication information indicates Manner 2, and the first indication information indicates that the maximum quantity of codewords that can be scheduled by one piece of DCI is 1, it may be determined that the data transmission manner is Manner 2-1. Alternatively, if the second indication information indicates Manner 2, and the first indication information indicates that the maximum quantity of codewords that can be scheduled by one piece of DCI is 2, it may be determined that the data transmission manner is Manner 2-2.

Alternatively, when the second indication information indicates Manner 2, whether Manner 2-1 or Manner 2-2 is specifically used is further determined based on a total quantity of RVs corresponding to each TCI-state. For example, if the total quantity of RVs corresponding to each TCI-state is 1, it may be determined that the data transmission manner is Manner 2-1; or if the total quantity of RVs corresponding to each TCI-state is 2, it may be determined that the data transmission manner is Manner 2-2.

In another possible implementation, the second indication information may alternatively include a plurality of parameters, and the plurality of parameters are used to indicate a specific one of the foregoing data transmission manners.

For example, the second indication information includes a quantity of consecutive transmissions of same data (for example, a parameter pdsch-AggregationFactor), and a quantity of TCI-states or an index of a TCI-state used for transmission. For example, when the second indication information indicates that the quantity of consecutive transmissions of the same data is greater than 1 and the quantity of TCI-states used for transmission is greater than 1, it may be determined that the data transmission manner is Manner 3. That is, when the second indication information indicates that the quantity of consecutive transmissions of the same data is greater than 1 and the quantity of TCI-states used for transmission is greater than 1 (for example, a value of the parameter pdsch-AggregationFactor is configured to a value greater than 1), the terminal device determines that the plurality of TCI-states are used for time division transmission, to be specific, each of the plurality of TCI-states is sequentially used for transmission in each of different time units. When the second indication information indicates that the quantity of consecutive transmissions of the same data is equal to 1 or does not indicate the quantity of consecutive transmissions of the same data (for example, the parameter pdsch-AggregationFactor is not configured), and the quantity of TCI-states used for transmission is greater than 1, the terminal device determines that the plurality of TCI-states are used for simultaneous transmission. To be specific, the plurality of TCI-states are used for simultaneous transmission in a same transmission.

Further, a TCI-state used for each transmission may be further determined based on the quantity of consecutive transmissions of the same data and the quantity of TCI-states used for transmission. For example, if the second indication information indicates that the quantity of consecutive transmissions of the same data is k and k TCI-states are used for transmission, it may be determined that a TCI-state used for each of the k transmissions is one of the indicated k TCI-states.

Specifically, a TCI-state corresponding to each transmission may be determined in ascending order or descending order of indexes of the k TCI-states. For example, indexes of TCI-states corresponding to all transmissions increase sequentially or decrease sequentially.

Alternatively, a TCI-state corresponding to each transmission may be determined based on an order in which the second indication information indicates the k TCI-states. For example, if the second indication information indicates two TCI-states {TCI #2, TCI #1}, it may be determined that a TCI-state corresponding to the TCI #2 is used for a first transmission, and a TCI-state corresponding to the TCI #1 is used for a second transmission.

Alternatively, a TCI-state used for each transmission may be determined in ascending order or descending order of indexes of DMRS ports, indexes of DMRS port groups, or DMRS code division multiplexing (CDM) groups, where the indexes are associated with the k TCI-states. For example, the second indication information indicates two TCI-states {TCI #2, TCI #1}, where a TCI-state corresponding to the TC #2 is associated with a DMRS port, a DMRS port group, or a DMRS port CDM group with a smaller index, and a TCI-state corresponding to the TCI #1 is associated with a DMRS port, a DMRS port group, or a DMRS port CDM group with a larger index. In this case, a TCI-state corresponding to the TCI #2 is used for a first transmission, and a TCI-state corresponding to the TC #1 is used for a second transmission. In the foregoing example, indexes of DMRS ports, DMRS port groups, or DMRS port CDM groups used for all transmissions increase sequentially. Optionally, indexes of DMRS ports, DMRS port groups, or DMRS port CDM groups used for all transmissions may alternatively decrease sequentially. In this case, a TCI-state corresponding to the TC #1 is used for a first transmission, and a TCI-state corresponding to the TC #2 is used for a second transmission.

In the foregoing solution, when the quantity of TCI-states in the second indication information is less than the quantity of consecutive transmissions of the same data, each transmission may be performed by cyclically using each TCI-state in the foregoing order. For example, if the second indication information indicates two TCI-states {TCI #2, TCI #1}, and the second indication information indicates that the quantity of consecutive transmissions of the same data is 4, TCI-states used for the four transmissions are respectively {TCI #2, TCI #1, TCI #2, TCI #1}.

In addition, when the quantity of TCI-states indicated by the second indication information is greater than 1 and the quantity of consecutive transmissions of the same data is equal to 1, the plurality of TCI-states indicated by the second indication information are used for one transmission. In other words, the terminal device determines that the network device simultaneously transmits data by using the plurality of TCI-states. In this case, the terminal device needs to receive data based on the foregoing TCI-states. Specifically, when the maximum quantity of codewords that can be scheduled by one piece of DCI and that is indicated by the first indication information is greater than 1, and the quantity of TCI-states indicated by the second indication information is greater than 1, the terminal device may determine that the network device performs transmission in Manner 2-2.

In the foregoing solution, the k TCI-states may be indicated by using a TC field in the DCI. For example, each value of the TCI field may correspond to a plurality of TCI-states. The quantity of consecutive transmissions of the same data may be indicated by using a radio resource control (RRC) parameter (for example, pdsch-AggregationFactor).

When the second indication information indicates that the data transmission manner is Manner 3, one or more types of the following information may be further indicated: a quantity of consecutive transmissions of same data, a time length (for example, a quantity of orthogonal frequency division multiplexing (OFDM) symbols) used for each transmission, a time domain resource granularity (for example, a symbol level, a mini-slot level, or a slot level) used for each transmission, a quantity of RVs transmitted, a mapping rule between a quantity of transmissions and RVs (which RV is used for each transmission), a mapping rule between a TCI-state and an RV (each TCI-state corresponds to an RV), and a TCI-state or a quantity of TCI-states used for each transmission.

The following describes the DCI.

Figure 4:
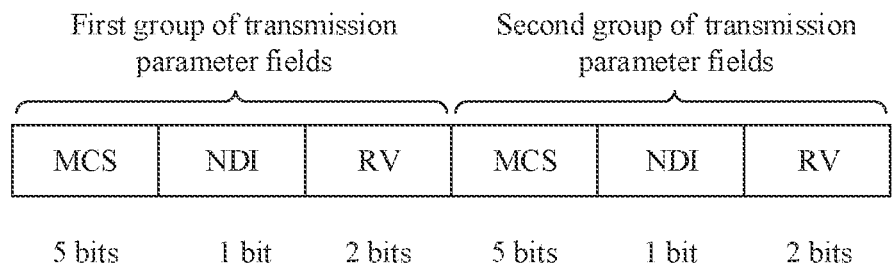
FIG. 4 is a schematic diagram of a DCI format according to an embodiment of this application.

As shown in FIG. 4, a DCI format 1-1 (DCI format 1-1) in R15 defines two groups of transmission parameter fields (a first group of transmission parameter fields and a second group of transmission parameter fields), and each group of transmission parameter fields include an MCS field, a new data indicator (NDI), and an RV field. Each group of transmission parameter fields correspond to one transport block (TB).

From a perspective of a network device side, the network device needs to determine a quantity of groups of transmission parameter fields that should be included in the DCI sent by the network device. There are two cases: When only one TB is scheduled, corresponding DCI includes only the first group of transmission parameter fields, which is used to indicate transmission parameters such as an MCS, an NDI, and an RV of the TB. When two TBs are scheduled, corresponding DCI includes the foregoing two groups of transmission parameter fields, which are respectively used to indicate transmission parameters of the TBs. From a perspective of a terminal device side, after receiving one piece of DCI, the terminal device needs to determine a quantity of groups of transmission parameter fields included in the DCI. There are also two cases similarly: If the first indication information indicates that the maximum quantity of codewords that can be scheduled by one piece of DCI is 2, it is determined that the DCI includes the foregoing two groups of transmission parameter fields. Otherwise, it is determined that the DCI includes only the first group of transmission parameter fields.

In this embodiment of this application, a group of transmission parameter fields are a group of fields obtained through division based on a codeword or a TB, and each group of transmission parameter fields correspond to one codeword or one TB. For example, in R15, a group of transmission parameter fields include an MCS field, an NDI field, and an RV field. However, a quantity of fields included in the group of transmission parameter fields is not limited in this application. Optionally, each group of transmission parameter fields may further include other fields than the MCS field, the NDI field, and the RV field.

In this embodiment of this application, the DCI may include the first group of transmission parameter fields and the second group of transmission parameter fields, the first group of transmission parameter fields correspond to first data, and the second group of transmission parameter fields correspond to second data. The first data and the second data may be any one of the following: two codewords, two RVs, data corresponding to two TCI-states, data corresponding to two DMRS ports or port groups, data corresponding to two DMRS port CDM groups, and data transmitted by two TRPs.

The following describes several manners in which the DCI includes the first group of transmission parameter fields and the second group of transmission parameter fields.

Manner 1: If the first indication information indicates that a first condition is not satisfied, the DCI includes only the first group of transmission parameter fields.

The first condition may include that the maximum quantity of codewords that can be scheduled by one piece of DCI is 2. For example, when the first indication information includes a parameter maxNrofCodeWordsScheduledByDCI and a value of the parameter is 1, it is determined that the first condition is not met.

Manner 2: if the first indication information indicates that a first condition is satisfied, and the second indication information indicates that a second condition is not satisfied, two groups of transmission parameter fields (the first group of transmission parameter fields and the second group of transmission parameter fields) are determined in the DCI, and the first group of transmission parameter fields and the second group of transmission parameter fields respectively correspond to two different TBs.

Manner 3: If the first indication information indicates that a first condition is satisfied, and the second indication information indicates that a second condition is satisfied, it is determined that the DCI includes two groups of transmission parameter fields (the first group of transmission parameter fields and the second group of transmission parameter fields), the first group of transmission parameter fields correspond to the first data, and the second group of transmission parameter fields correspond to the second data. The first data and the second data may be two codewords corresponding to a same TB. For example, a same TB is encoded to generate four RVs, and two different RVs are selected from the four RVs as two codewords for transmission, or one RV is selected from the four RVs and the RV is used as two codewords for repeat transmission. The first data and the second data may be codewords respectively determined by two same TBs. For example, each of two TBs with same content is encoded to generate four RVs, and one RV is selected from the four RVs corresponding to each TB and used as two codewords for transmission.

The second condition may be that the network device separately sends, on different frequency domain resources, two codewords corresponding to same data. Alternatively, the network device simultaneously transmits, to the terminal device by using a plurality of TCI-states, a plurality of codewords or a plurality of RVs corresponding to same data. Alternatively, the second condition may be that the network device simultaneously transmits, to the terminal device on different frequency domain resources, a plurality of codewords or a plurality of RVs corresponding to same data. Alternatively, the second condition may be that the network device simultaneously separately transmits, to the terminal device on different frequency domain resources by using a plurality of TCI-states, a plurality of codewords or a plurality of RVs corresponding to same data. A description manner of the second condition is not limited in this application. It may be considered that the second condition is satisfied provided that a transmission effect corresponding to the second condition listed above can be achieved. For example, when the second indication information indicates that the data transmission manner is Manner 2-2, it may also be considered that the second condition is satisfied.

In this embodiment of this application, specific meanings of an MCS field, an NDI field, and an RV field of the first data that are included in the first group of transmission parameter fields are the same as those in the prior art. Details are not described herein. The following mainly describes the second group of transmission parameter fields in detail.

The second group of transmission parameter fields include an MCS field, an NDI field, and an RV field that are of the second data. The second data uses new data indication information indicated by the NDI field of the first group of transmission parameter fields, to be specific, RV information of the second data is the same as RV information of the first data. The RV field of the second group of transmission parameter fields is still used to indicate the RV information of the second data.

The MCS field of the second data is used or the MCS field and the NDI field of the second data are used to indicate one or a combination of the following information: a modulation order used for the second data, a bit rate used for the second data, and frequency resource information of the second data.

The frequency resource information includes one or a combination of the following: a frequency domain resource offset, a granularity of the frequency domain resource offset, a frequency domain resource quantity difference, a granularity of the frequency domain resource quantity difference, and a frequency domain resource allocation type.

A frequency domain resource of the first data and a frequency domain resource of the second data each are a segment of continuous frequency domain resources, and the two segments of continuous frequency domain resources do not overlap. The two segments of continuous frequency domain resources may be connected. For example, the last frequency domain resource of the first data is adjacent to the first frequency domain resource of the second data. Alternatively, the first frequency domain resource of the first data is adjacent to the last frequency domain resource of the second data. There may also be a specific frequency domain resource offset between the two segments of continuous frequency domain resources.

Figure 5:
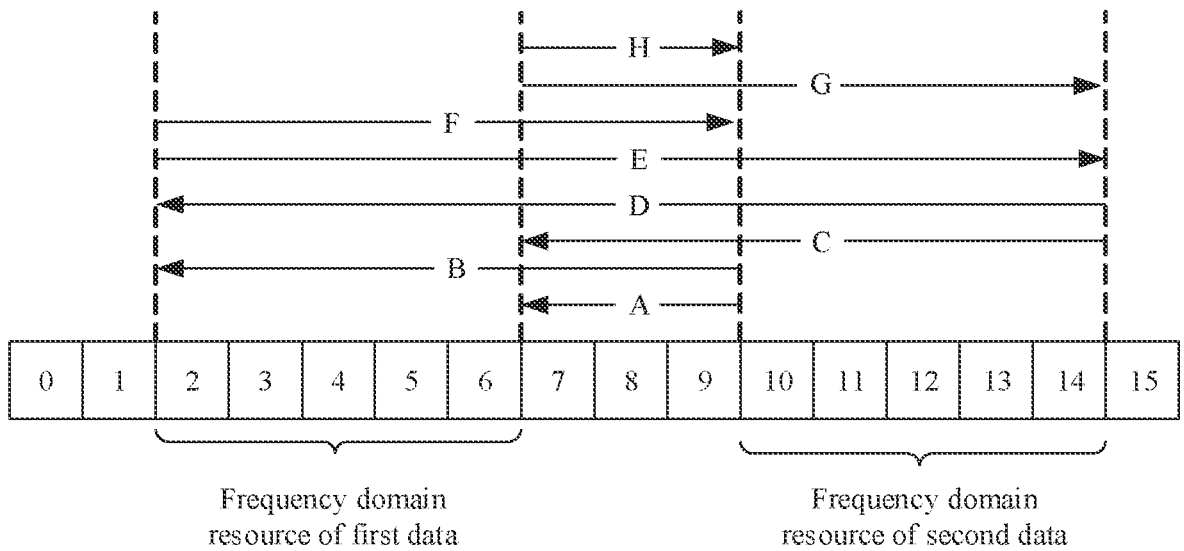
FIG. 5 is a schematic diagram of a frequency domain resource offset according to an embodiment of this application.

As shown in FIG. 5, the frequency domain resource offset is: A. an offset from a start location of a frequency domain resource of the second data to an end location of a frequency domain resource of the first data; B. an offset from a start location of a frequency domain resource of the second data to a start location of a frequency domain resource of the first data; C. an offset from an end location of a frequency domain resource of the second data to an end location of a frequency domain resource of the first data; D. an offset from an end location of a frequency domain resource of the second data to a start location of a frequency domain resource of the first data; E. an offset from a start location of a frequency domain resource of the first data to an end location of a frequency domain resource of the second data; F. an offset from a start location of a frequency domain resource of the first data to a start location of a frequency domain resource of the second data; G. an offset from an end location of a frequency domain resource of the first data to an end location of a frequency domain resource of the second data; or H. an offset from an end location of a frequency domain resource of the first data to a start location of a frequency domain resource of the second data.

The frequency domain resource of the second data may be determined in ascending order of indexes of the frequency domain resource. For example, the frequency domain resource offset is added to an index of the last resource of the frequency domain resource of the first data, to obtain an index of the first resource of the frequency domain resource of the second data. The frequency domain resource of the second data may be determined in descending order of indexes of the frequency domain resource. For example, the frequency domain resource offset is subtracted from an index of the first resource of the frequency domain resource of the first data, to obtain an index of the last resource of the frequency domain resource of the second data.

The frequency domain resource offset needs to satisfy a specific constraint condition. For example, the frequency domain resource of the second data that is calculated based on the frequency domain resource offset cannot exceed a frequency domain resource range of a currently used carrier or bandwidth part (BWP). For example, an index of the last RB or RBG of the second data cannot be greater than an index of a maximum RBG of a current carrier or BWP, or an index of the first RB or RBG of the second data cannot be less than an index of a minimum RBG of a current carrier or BWP.

Correspondingly, allocation of the frequency domain resource needs to satisfy the foregoing constraint conditions. Specifically, during allocation of the frequency domain resource, it needs to be ensured that determining of a start RB or RBG of the first data, an RB or an RBG of the second data, a quantity of RBs or RBGs allocated to the first data, a quantity of RBs or RBGs allocated to the second data, and a value of the frequency domain resource offset between the first data and the second data satisfies the foregoing constraint conditions.

In addition to satisfying the foregoing constraint conditions, another method may alternatively be used to avoid that an allocated frequency domain resource exceeds a BWP range.

In a possible implementation, the frequency domain resource of the second data is determined in ascending order of indexes of the frequency domain resource. When the indexes of the frequency domain resource of the second data exceed an index of a maximum frequency domain resource of the BWP, the frequency domain resource of the second data is recalculated by using an index of a minimum frequency domain resource as a start point. For example, one BWP includes 20 RBs (an RB #0 to an RB #19), the frequency domain resource of the first data is RBs {#10, #11, #12, #13, #14, #15}, and the frequency domain resource offset is 3. Therefore, the calculated frequency domain resource of the second data is RBs {#18, #19, #20, #21, #22, #23}. Because the RBs {#20, #21, #22, #23} exceed a maximum RB (#19) in the BWP, the RBs are recalculated by using a minimum RB (#0) as a start point. That is, the RBs {#20, #21, #22, #23} are converted into RBs {#0, #1, #2, #3}. Therefore, the frequency domain resource of the second data is RBs {#18, #19, #0, #1, #2, #3}.

In another possible implementation, the frequency domain resource of the second data is determined in descending order of indexes of the frequency domain resource. When the indexes of the frequency domain resource of the second data are less than an index of a minimum frequency domain resource of the BWP, the frequency domain resource of the second data is recalculated by using an index of a maximum frequency domain resource as a start point. For example, one BWP includes 20 RBs (an RB #0 to an RB #19), the frequency domain resource of the first data is RBs {#5, #6, #7, #8, #9, #10}, and the frequency domain resource offset is 3. Therefore, the calculated frequency domain resource of the second data is RBs {#−3, #−2, #−1, #0, #1, #2}. Because the RBs {#−3, #−2, #−1} are less than a minimum RB (#0) of the BWP, the RBs are recalculated by using a maximum RB (#19) as a start point. That is, the RBs {#−3, #−2, #−1} are converted into RBs {#17, #18, #19}. Therefore, the frequency domain resource of the second data is RBs {#17, #18, #19, #0, #1, #2}.

The granularity of the frequency domain resource offset or the granularity of the frequency domain resource quantity difference is a resource element (RE), a resource block (RB), a resource block group (RBG), a precoding resource block group (PRG), or a subband.

The frequency domain resource offset may be an offset between two REs, RBs, RBGs, PRGs, or subbands. The offset may be a difference between numbers of two REs, RBs, RBGs, PRGs, or subbands. For example, an offset between an RB #10 and an RB #6 is 10−6=4 RBs. The offset may alternatively be a quantity of resources spaced between two REs, RBs, RBGs, PRGs, or subbands. For example, if the RB #10 and the RB #6 are spaced by three RBs, the offset is three RBs. The frequency domain resource may be an RE, an RB, an RBG, a PRG, or a subband.

When a frequency domain resource quantity used by the first data is the same as a frequency domain resource quantity used by the second data, the network device only needs to indicate the frequency domain resource offset, and the frequency domain resource of the second data may be determined based on the frequency domain resource of the first data and the frequency domain resource offset. For example, as shown in FIG. 5, the frequency domain resource quantity used by the first data is the same as the frequency domain resource quantity used by the second data. For example, the frequency domain resource is an RB. If the frequency domain resource of the first data corresponds to an RB #2 to an RB #6, and there is an offset of eight RBs between the first RB (an RB with a minimum number) of the second data and the last RB (an RB with a maximum number) of the first data, it may be determined that the frequency domain resource of the second data corresponds to an RB #10 to an RB #14.

When the frequency domain resource quantity used by the first data is different from the frequency domain resource quantity used by the second data, the frequency domain resource quantity difference is a difference obtained by subtracting the frequency domain resource quantity of the second data from the frequency domain resource quantity of the first data, or a difference obtained by subtracting the frequency domain resource quantity of the first data from the frequency domain resource quantity of the second data. For example, when the granularity of the frequency domain resource offset is an RB, and the frequency domain resource quantity difference is 4, it indicates that a difference is four RBs.

The frequency domain resource offset or the frequency domain resource quantity difference may be indicated by using radio resource control (RRC) signaling, media access control control element (MAC-CE) signaling, or DCI signaling, or uses a default value or uses a value reported by the terminal device.

The following describes various possible implementations of the MCS field and the NDI field of the second data by using examples.

In a possible implementation, the bit rate of the second data is the same as that of the first data, and the modulation order of the second data is indicated by using the MCS field, or the MCS field and the NDI field in the second group of transmission parameter fields. Alternatively, the modulation order of the second data is the same as that of the first data, and the bit rate of the second data is indicated by using the MCS field, or the MCS field and the NDI field in the second group of transmission parameter fields.

In another possible implementation, the MCS field of the second data may be used to indicate the modulation order of the second data and the frequency domain resource offset of the second data. As shown in Table 1, a value of each MCS field corresponds to a value of the modulation order and a value of the frequency domain resource offset.

TABLE 1

| MCS Field | Modulation order | Frequency domain resource offset |
|---|---|---|
| 00000 | 2 | 0 |
| 00001 | 4 | 0 |
| 00010 | 6 | 0 |
| 00011 | 8 | 0 |
| 00100 | 2 | 1 |
| 00101 | 4 | 1 |
| 00110 | 6 | 1 |
| 00111 | 8 | 1 |
| ... | ... | ... |
| 11111 | 8 | 7 |

In still another possible implementation, the NDI field of the second data is used to indicate at least one of the granularity of the frequency domain resource offset, the granularity of the frequency domain resource quantity difference, and the frequency domain resource allocation type.

In still another possible implementation, because the MCS field occupies 5 bits, and the NDI field occupies 1 bit, the MCS field and the NDI field of the second data may be jointly used as a 6-bit field for indication. The MCS field and the NDI field of the second data are used to indicate one or a combination of the following information: the modulation order, the frequency domain resource offset, the granularity of the frequency domain resource offset, the frequency domain resource quantity difference, the granularity of the frequency domain resource quantity difference, and the frequency domain resource allocation type that are used for the second data.

S302. The network device sends the first indication information, the second indication information, and the DCI to the terminal device.

This step may alternatively be performed by a chip or a chip system in the network device.

The first indication information and the second indication information may be sent by using one piece of signaling, or may be sent by using a plurality of pieces of signaling. For example, the first indication information and the second indication information may be carried in the RRC signaling, the media access control control element (MAC-CE) signaling, or the DCI. In addition, content included in the second indication information may be carried in one piece of signaling, or may be carried in different pieces of signaling.

It should be noted that, the several data transmission manners in step S302 are all manners in which scheduling is performed based on one piece of DCI. To be specific, data transmitted by a plurality of TRPs is scheduled by using one piece of DCI. In addition to the foregoing several data transmission manners, the network device may alternatively separately schedule, by using a plurality of pieces of DCI, data transmitted by each TRP. For example, in one transmission, each TRP separately transmits one piece of DCI to the terminal device, and the DCI sent by the TRP is used to indicate a parameter related to data sent by the TRP. In this case, to enable the terminal device to receive a plurality of pieces of DCI, the network device needs to indicate, to the terminal device, that the network device sends the plurality of pieces of DCI. Specifically, the following manners may be used for indication.

In a possible implementation, the network device sends third indication information to the terminal device, where the third indication information is used to indicate a quantity of pieces of DCI to be received by the terminal device.

In another possible implementation, a field in the DCI may be used to indicate a quantity of pieces of currently transmitted DCI, or indicate whether there is another piece of DC to be received.

In still another possible implementation, a quantity of control resource sets (CORESET) configured by the network device is used for indication. For example, when the quantity of configured CORESETs is greater than a specific threshold, it indicates that the terminal device needs to receive a plurality of pieces of DCI; otherwise, it indicates that the terminal device needs to receive only one piece of DCI.

In still another possible implementation, a type of a search space associated with a CORESET configured by the network device is used for indication. For example, among search spaces associated with configured CORESETs, if a quantity of search spaces whose types are user equipment-specific (ue-Specific) is greater than 1, it indicates that the terminal device needs to receive a plurality of pieces of DCI. Alternatively, if a quantity of CORESETs associated with search spaces whose types are ue-Specific is greater than 1, it indicates that the terminal device needs to receive a plurality of pieces of DCI. When the terminal device needs to receive a plurality of pieces of DCI, in one reception, the terminal device needs to receive two pieces of DCI before stopping receiving.

S303. The terminal device receives the first indication information, the second indication information, and the DCI from the network device.

This step may alternatively be performed by a chip or a chip system in the terminal device.

S304. The terminal device determines, in the DCI, the first group of transmission parameter fields corresponding to the first data and the second group of transmission parameter fields corresponding to the second data.

This step may alternatively be performed by a chip or a chip system in the terminal device.

In a possible implementation, if it is determined, based on the first indication information, that the first condition is satisfied, the terminal device determines, in the DCI, the first group of transmission parameter fields corresponding to the first data and the second group of transmission parameter fields corresponding to the second data.

In another possible implementation, if it is determined, based on the first indication information, that the first condition is satisfied, and it is determined, based on the second indication information, that the second condition is satisfied, the terminal device determines, in the DCI, the first group of transmission parameter fields corresponding to the first data and the second group of transmission parameter fields corresponding to the second data.

In still another possible implementation, if it is determined, based on the first indication information, that the first condition is satisfied, and it is determined, based on the second indication information, that the second condition is not satisfied, the terminal device determines that the first group of transmission parameter fields and the second group of transmission parameter fields in the DCI respectively correspond to two different transport blocks.

For descriptions of the first condition and the second condition, refer to the foregoing descriptions. Details are not described herein again.

According to the information determining method provided in this embodiment of this application, when the network device indicates parameters such as frequency domain resources, RVs, and MCSs used by two TRPs, the MCS field, the NDI field, and the RV field that are of the first data are still indicated in the first group of transmission parameter fields in the DCI. The MCS field and the NDI field of the second data are multiplexed in the second group of transmission parameter fields in the DCI, to indicate one or a combination of the following information: one of the modulation order or the bit rate used for the second data and the frequency resource information of the second data. Transmission parameters such as the modulation order, the bit rate, and the NDI that are used for the second data and that are not indicated in the second group of transmission parameter fields in the DCI use same transmission parameters of the first data. A quantity of pieces of the DCI does not need to be increased or a new DCI field does not need to be introduced, so that when the network device indicates the parameters such as the frequency domain resources, the RVs, and the MCSs that are used by the two TRPs, overheads of time-frequency resources are not increased.

It may be understood that, in the foregoing embodiment, methods and/or steps implemented by the terminal device may also be implemented by a component (for example, a chip or a circuit) that can be used in the terminal device, and methods and/or steps implemented by the network device may also be implemented by a component that can be used in the network device.

The foregoing mainly describes the solutions provided in the embodiments of this application from a perspective of interaction between the network elements. Correspondingly, an embodiment of this application further provides a communications apparatus, and the communications apparatus is configured to implement the foregoing methods. The communications apparatus may be the terminal device in the foregoing method embodiment, or an apparatus including the foregoing terminal device, or a chip or a functional module in the terminal device. Alternatively, the communications apparatus may be the network device in the foregoing method embodiment, or an apparatus including the foregoing network device, or a chip or a functional module in the network device. It can be understood that, to implement the foregoing functions, the communications apparatus includes a corresponding hardware structure and/or software module for performing the functions. A person skilled in the art should be easily aware that, in combination with the examples of units and algorithm steps described in the embodiments disclosed in this specification, this application can be implemented by hardware or a combination of hardware and computer software. Whether a function is performed by hardware or hardware driven by computer software depends on a particular application and a design constraint condition of the technical solutions. A person skilled in the art may use different methods to implement the described functions for each particular application, but it should not be considered that the implementation goes beyond the scope of this application.

In the embodiments of this application, the communications apparatus may be divided into functional modules based on the foregoing method embodiment. For example, each functional module may be obtained through division based on each corresponding function, or two or more functions may be integrated into one processing module. The integrated module may be implemented in a form of hardware, or may be implemented in a form of a software functional module. It should be noted that, in the embodiments of this application, division into the modules is used as an example, and is merely logical function division. In actual implementation, another division manner may be used.

Figure 6:
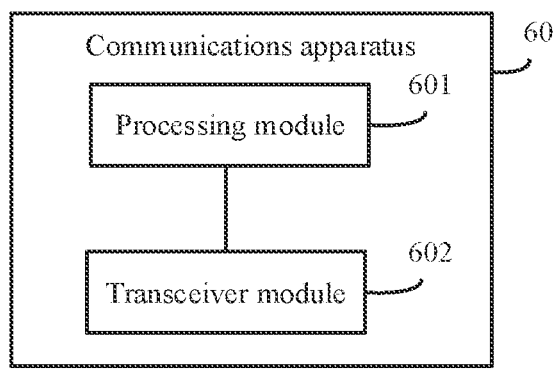
FIG. 6 is a schematic structural diagram of a terminal device according to an embodiment of this application.

For example, the communications apparatus is the terminal device in the foregoing method embodiment. FIG. 6 is a schematic structural diagram of a communications apparatus 60. The communications apparatus 60 includes a processing module 601 and a transceiver module 602. The transceiver module 602 may also be referred to as a transceiver unit, and includes a sending unit and/or a receiving unit. For example, the transceiver module 602 may be a transceiver circuit, a transceiver machine, a transceiver, or a communications interface, and is configured to implement a sending function and/or a receiving function of the terminal device in the foregoing method embodiment, for example, to perform step S303 in FIG. 3. The processing module 601 is configured to process data, to implement a processing function of the terminal device in the foregoing method embodiment, for example, to perform step S304 in FIG. 3.

For example, the transceiver module 602 is configured to receive first indication information, second indication information, and downlink control information (DCI) from a network device, where the first indication information is used to indicate a maximum quantity of codewords that can be scheduled by one piece of DCI, and the second indication information is used to indicate a data transmission manner.

The processing module 601 is configured to: if it is determined, based on the first indication information, that a first condition is satisfied, and it is determined, based on the second indication information, that a second condition is satisfied, determine, in the DCI, a first group of transmission parameter fields corresponding to first data and a second group of transmission parameter fields corresponding to second data, where the first group of transmission parameter fields include a modulation and coding scheme (MCS) field, a new data indicator (NDI) field, and a redundancy version (RV) field that are of the first data, and the second group of transmission parameter fields include an MCS field, an NDI field, and an RV field that are of the second data; and the MCS field of the second data is used or the MCS field and the NDI field of the second data are used to indicate one or a combination of the following information: a modulation order used for the second data, a bit rate used for the second data, and frequency resource information of the second data.

Optionally, the first condition includes: the maximum quantity of codewords that can be scheduled by one piece of DCI is 2.

Optionally, the second condition includes: the network device separately sends, on different frequency domain resources, two codewords corresponding to same data.

Optionally, the processing module 601 is further configured to: if it is determined, based on the first indication information, that the first condition is satisfied, and it is determined, based on the second indication information, that the second condition is not satisfied, determine that the first group of transmission parameter fields and the second group of transmission parameter fields that are in the DCI respectively correspond to two different transport blocks. All related content of the steps in the foregoing method embodiment may be cited in function descriptions of corresponding functional modules or descriptions on the foregoing method side. Details are not described herein again.

Optionally, the frequency resource information includes one or a combination of the following: a frequency domain resource offset, a granularity of the frequency domain resource offset, a frequency domain resource quantity difference, a granularity of the frequency domain resource quantity difference, and a frequency domain resource allocation type.

Optionally, the NDI field of the second data is used to indicate at least one of the granularity of the frequency domain resource offset, the granularity of the frequency domain resource quantity difference, and the frequency domain resource allocation type.

Optionally, the frequency domain resource offset is: an offset from a start location of a frequency domain resource of the second data to an end location of a frequency domain resource of the first data or an offset from a start location of a frequency domain resource of the second data to a start location of a frequency domain resource of the first data; or an offset from an end location of a frequency domain resource of the second data to an end location of a frequency domain resource of the first data; or an offset from an end location of a frequency domain resource of the second data to a start location of a frequency domain resource of the first data; or an offset from a start location of a frequency domain resource of the first data to an end location of a frequency domain resource of the second data; or an offset from a start location of a frequency domain resource of the first data to a start location of a frequency domain resource of the second data; or an offset from an end location of a frequency domain resource of the first data to an end location of a frequency domain resource of the second data; or an offset from an end location of a frequency domain resource of the first data to a start location of a frequency domain resource of the second data.

Optionally, the granularity of the frequency domain resource offset or the granularity of the frequency domain resource quantity difference is a resource element (RE), a resource block (RB), a resource block group (RBG), a precoding resource block group (PRG), or a subband.

Optionally, the frequency domain resource quantity difference is a difference obtained by subtracting a frequency domain resource quantity of the second data from a frequency domain resource quantity of the first data, or a difference obtained by subtracting a frequency domain resource quantity of the first data from a frequency domain resource quantity of the second data.

Optionally, the frequency domain resource offset or the frequency domain resource quantity difference is indicated by using radio resource control (RRC) signaling, media access control control element (MAC-CE) signaling, or DCI signaling, or uses a default value or uses a value reported by the terminal device.

Optionally, the bit rate of the second data is the same as that of the first data, and the modulation order is indicated by using the MCS field, or the MCS field and the NDI field in the second group of transmission parameter fields.

Optionally, the modulation order of the second data is the same as that of the first data, and the bit rate is indicated by using the MCS field, or the MCS field and the NDI field in the second group of transmission parameter fields.

Optionally, the second data uses new data indication information indicated by the NDI field in the first group of transmission parameter fields.

Optionally, the first data and the second data may be any one of the following: two codewords, two RVs, data corresponding to two TCI-states, data corresponding to two demodulation reference signal (DMRS) ports or port groups, data corresponding to two DMRS port code division multiplexing (CDM) groups, and data transmitted by using two TRPs.

Optionally, the frequency domain resource of the first data and the frequency domain resource of the second data each are a segment of continuous frequency domain resources, and the two segments of continuous frequency domain resources do not overlap; or the frequency domain resource quantity used by the first data is the same as or different from the frequency domain resource quantity used by the second data; or the two segments of frequency domain resources are connected or are spaced by a specific quantity of frequency domain resources.

In this embodiment, the communications apparatus 60 is presented in a form of functional modules obtained through integration. The "module" herein may be a specific ASIC, a circuit, a processor and a memory that execute one or more software or firmware programs, an integrated logic circuit, and/or another device that can provide the foregoing functions. In a simple embodiment, a person skilled in the art may figure out that the communications apparatus 60 may be in a form of the terminal device 10 shown in FIG. 2.

For example, the processor 101 in the terminal device 10 shown in FIG. 2 may invoke a computer-executable instruction stored in the memory 102, so that the terminal device 10 performs the information determining method in the foregoing method embodiment.

Specifically, the processor 101 in the terminal device 10 shown in FIG. 2 may invoke the computer-executable instruction stored in the memory 102, to implement functions/implementation processes of the processing module 601 and the transceiver module 602 in FIG. 6. Alternatively, the processor 101 in the terminal device 10 shown in FIG. 2 may invoke the computer-executable instruction stored in the memory 102, to implement functions/implementation processes of the processing module 601 in FIG. 6, and the transceiver 103 in the terminal device 10 shown in FIG. 2 may implement functions/implementation processes of the transceiver module 602 in FIG. 6.

Because the communications apparatus 60 provided in this embodiment may perform the foregoing information determining method, for a technical effect that can be achieved by the communications apparatus 60, refer to the foregoing method embodiment. Details are not described herein again.

Figure 7:
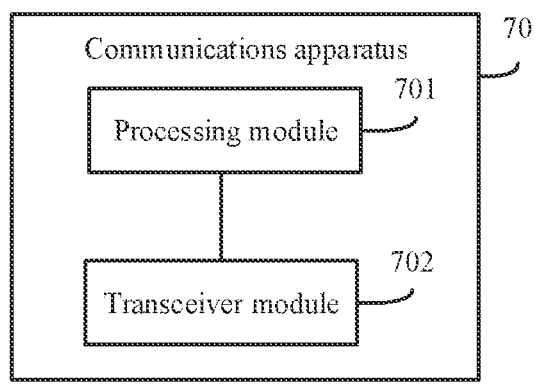
FIG. 7 is a schematic structural diagram of a network device according to an embodiment of this application.

Alternatively, for example, the communications apparatus is the network device in the foregoing method embodiment. FIG. 7 is a schematic structural diagram of a communications apparatus 70. The communications apparatus 70 includes a processing module 701 and a transceiver module 702. The transceiver module 702 may also be referred to as a transceiver unit, and includes a sending unit and/or a receiving unit. For example, the transceiver module 702 may be a transceiver circuit, a transceiver machine, a transceiver, or a communications interface, and is configured to implement a sending function and/or a receiving function of the network device in the foregoing method embodiment, for example, to perform step S302 in FIG. 3. The processing module 701 is configured to process data, to implement a processing function of the network device in the foregoing method embodiment, for example, to perform step S302 in FIG. 3.

For example, the processing module 701 is configured to: determine first indication information, second indication information, and downlink control information (DCI), where the first indication information is used to indicate a maximum quantity of codewords that can be scheduled by one piece of DCI, and the second indication information is used to indicate a data transmission manner; and if the first indication information indicates that a first condition is satisfied, and the second indication information indicates that a second condition is satisfied, the DCI includes a first group of transmission parameter fields corresponding to first data and a second group of transmission parameter fields corresponding to second data, where the first group of transmission parameter fields include a modulation and coding scheme (MCS) field, a new data indicator (NDI) field, and a redundancy version (RV) field that are of the first data, and the second group of transmission parameter fields include an MCS field, an NDI field, and an RV field that are of the second data; and the MCS field of the second data is used or the MCS field and the NDI field of the second data are used to indicate one or a combination of the following information: one of a modulation order or a bit rate used for the second data, and frequency resource information of the second data.

The transceiver module 702 is configured to: send the first indication information, the second indication information, and the DCI to a terminal device.

Optionally, the first condition includes: the maximum quantity of codewords that can be scheduled by one piece of DCI is 2.

Optionally, the second condition includes: the network device separately sends, on different frequency domain resources, two codewords corresponding to same data.

Optionally, the processing module 701 is further configured to: if the first indication information indicates that the first condition is satisfied, and the second indication information indicates that the second condition is not satisfied, determine that the first group of transmission parameter fields and the second group of transmission parameter fields that are in the DCI respectively correspond to two different transport blocks.

Optionally, the frequency resource information includes one or a combination of the following: a frequency domain resource offset, a granularity of the frequency domain resource offset, a frequency domain resource quantity difference, a granularity of the frequency domain resource quantity difference, and a frequency domain resource allocation type.

Optionally, the NDI field of the second data is used to indicate at least one of the granularity of the frequency domain resource offset, the granularity of the frequency domain resource quantity difference, and the frequency domain resource allocation type.

Optionally, the frequency domain resource offset is: an offset from a start location of a frequency domain resource of the second data to an end location of a frequency domain resource of the first data; or an offset from a start location of a frequency domain resource of the second data to a start location of a frequency domain resource of the first data; or an offset from an end location of a frequency domain resource of the second data to an end location of a frequency domain resource of the first data; or an offset from an end location of a frequency domain resource of the second data to a start location of a frequency domain resource of the first data; or an offset from a start location of a frequency domain resource of the first data to an end location of a frequency domain resource of the second data; or an offset from a start location of a frequency domain resource of the first data to a start location of a frequency domain resource of the second data or an offset from an end location of a frequency domain resource of the first data to an end location of a frequency domain resource of the second data; or an offset from an end location of a frequency domain resource of the first data to a start location of a frequency domain resource of the second data.

Optionally, the granularity of the frequency domain resource offset or the granularity of the frequency domain resource quantity difference is a resource element (RE), a resource block (RB), a resource block group (RBG), a precoding resource block group (PRG), or a subband.

Optionally, the frequency domain resource quantity difference is a difference obtained by subtracting a frequency domain resource quantity of the second data from a frequency domain resource quantity of the first data, or a difference obtained by subtracting a frequency domain resource quantity of the first data from a frequency domain resource quantity of the second data.

Optionally, the frequency domain resource offset or the frequency domain resource quantity difference is indicated by using radio resource control (RRC) signaling, media access control control element (MAC-CE) signaling, or DCI signaling, or uses a default value or uses a value reported by the terminal device.

Optionally, the bit rate of the second data is the same as that of the first data, and the modulation order is indicated by using the MCS field, or the MCS field and the NDI field in the second group of transmission parameter fields.

Optionally, the modulation order of the second data is the same as that of the first data, and the bit rate is indicated by using the MCS field, or the MCS field and the NDI field in the second group of transmission parameter fields.

Optionally, the second data uses new data indication information indicated by the NDI field in the first group of transmission parameter fields.

Optionally, the first data and the second data may be any one of the following: two codewords, two RVs, data corresponding to two TCI-states, data corresponding to two demodulation reference signal (DMRS) ports or port groups, data corresponding to two DMRS port code division multiplexing (CDM) groups, and data transmitted by using two TRPs.

Optionally, the frequency domain resource of the first data and the frequency domain resource of the second data each are a segment of continuous frequency domain resources, and the two segments of continuous frequency domain resources do not overlap; or the frequency domain resource quantity used by the first data is the same as or different from the frequency domain resource quantity used by the second data; or the two segments of frequency domain resources are connected or are spaced by a specific quantity of frequency domain resources.

All related content of the steps in the foregoing method embodiment may be cited in function descriptions of corresponding functional modules or descriptions on the foregoing method side. Details are not described herein again.

In this embodiment, the communications apparatus 70 is presented in a form of functional modules obtained through integration. The "module" herein may be a specific ASIC, a circuit, a processor and a memory that execute one or more software or firmware programs, an integrated logic circuit, and/or another device that can provide the foregoing functions. In a simple embodiment, a person skilled in the art may figure out that the communications apparatus 70 may be in a form of the network device 20 shown in FIG. 2.

For example, the processor 2022 in the network device 20 shown in FIG. 2 may invoke a computer-executable instruction stored in the memory 2021, so that the network device 20 performs the information determining method in the foregoing method embodiment.

Specifically, the processor 2022 in the network device 20 shown in FIG. 2 may invoke the computer-executable instruction stored in the memory 2021, to implement functions/implementation processes of the processing module 701 and the transceiver module 702 in FIG. 7. Alternatively, the processor 2022 in the network device 20 shown in FIG. 2 may invoke the computer-executable instruction stored in the memory 2021, to implement functions/implementation processes of the processing module 701 in FIG. 7, and the RRU 201 in the network device 20 shown in FIG. 2 may implement functions/implementation processes of the transceiver module 702 in FIG. 7.

Because the communications apparatus 70 provided in this embodiment may perform the foregoing information determining method, for a technical effect that can be achieved by the communications apparatus 70, refer to the foregoing method embodiment. Details are not described herein again.

An embodiment of this application further provides a communications apparatus. The communications apparatus includes a processor, a memory and a transceiver. The processor is coupled to the memory. When the processor executes a computer program or an instruction in the memory, the information determining method shown in FIG. 3 is performed.

An embodiment of this application further provides a communications apparatus. The communications apparatus includes a processor. The processor is coupled to a memory. When the processor executes a computer program or an instruction in the memory, the information determining method shown in FIG. 3 is performed.

An embodiment of this application further provides a chip, including a processor and an interface, configured to: invoke a computer program stored in a memory from the memory, and run the computer program, to perform the information determining method shown in FIG. 3.

An embodiment of this application further provides a computer-readable storage medium. The computer-readable storage medium stores an instruction. When the instruction is run on a computer or a processor, the computer or the processor is enabled to perform the information determining method performed by the terminal device or the network device in FIG. 3.

An embodiment of this application further provides a computer program product including an instruction. When the instruction is run on a computer or a processor, the computer or the processor is enabled to perform the information determining method performed by the terminal device or the network device in FIG. 3.

An embodiment of this application provides a chip system. The chip system includes a processor, used by a communications apparatus to perform the information determining method performed by the terminal device in FIG. 3. For example, the processor receives first indication information, second indication information, and downlink control information (DCI) from a network device, where the first indication information is used to indicate a maximum quantity of codewords that can be scheduled by one piece of DCI, and the second indication information is used to indicate a data transmission manner; and if it is determined, based on the first indication information, that a first condition is satisfied, and it is determined, based on the second indication information, that a second condition is satisfied, determines, in the DCI, a first group of transmission parameter fields corresponding to first data and a second group of transmission parameter fields corresponding to second data, where the first group of transmission parameter fields include a modulation and coding scheme (MCS) field, a new data indicator (NDI) field, and a redundancy version (RV) field that are of the first data, and the second group of transmission parameter fields include an MCS field, an NDI field, and an RV field that are of the second data; and the MCS field of the second data is used or the MCS field and the NDI field of the second data are used to indicate one or a combination of the following information: a modulation order used for the second data, a bit rate used for the second data, and frequency resource information of the second data.

In a possible design, the chip system further includes a memory. The memory is configured to store a program instruction and data that are necessary for a terminal device. The chip system may include a chip and an integrated circuit, or may include a chip and another discrete device. This is not specifically limited in this embodiment of this application.

An embodiment of this application provides a chip system. The chip system includes a processor, used by a communications apparatus to perform the information determining method performed by the network device in FIG. 3. For example, the processor determines first indication information, second indication information, and downlink control information (DCI), where the first indication information is used to indicate a maximum quantity of codewords that can be scheduled by one piece of DCI, and the second indication information is used to indicate a data transmission manner; and if the first indication information indicates that a first condition is satisfied, and the second indication information indicates that a second condition is satisfied, the DCI includes a first group of transmission parameter fields corresponding to first data and a second group of transmission parameter fields corresponding to second data, where the first group of transmission parameter fields include a modulation and coding scheme (MCS) field, a new data indicator (NDI) field, and a redundancy version (RV) field that are of the first data, and the second group of transmission parameter fields include an MCS field, an NDI field, and an RV field that are of the second data and the MCS field of the second data is used or the MCS field and the NDI field of the second data are used to indicate one or a combination of the following information: one of a modulation order or a bit rate used for the second data, and frequency resource information of the second data and sends the first indication information, the second indication information, and the DCI to a terminal device.

In a possible design, the chip system further includes a memory. The memory is configured to store a program instruction and data that are necessary for a network device. The chip system may include a chip and an integrated circuit, or may include a chip and another discrete device. This is not specifically limited in this embodiment of this application.

The communications apparatus, the chip, the computer storage medium, the computer program product, or the chip system provided in this application is configured to perform the information determining method provided above. Therefore, for beneficial effects that can be achieved, refer to the beneficial effects in the implementations provided above. Details are not described herein again.

The processor in the embodiments of this application may be a chip. For example, the processor may be a field programmable gate array (FPGA), an application-specific integrated chip (ASIC), a system on chip (SoC), a central processing unit (CPU), a network processor (NP), a digital signal processor (DSP), a micro controller unit (MCU), a programmable logic device (PLD), or another integrated chip.

The memory in the embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through example but not limitative description, many forms of RAMs are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory in the system and the method described in this specification aims to include but is not limited to these memories and any memory of another proper type.

It should be understood that sequence numbers of the foregoing processes do not mean execution sequences in the embodiments of this application. The execution sequences of the processes should be determined based on functions and internal logic of the processes, and should not be construed as any limitation on the implementation processes of the embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on a particular application and a design constraint condition of the technical solutions. A person skilled in the art may use different methods to implement the described functions for each particular application, but it should not be considered that the implementation goes beyond the scope of this application.

It may be clearly understood by a person skilled in the art that, for convenient and brief description, for a detailed working process of the system, apparatus, and units described above, refer to a corresponding process in the foregoing method embodiment, and details are not described herein again.

In the several embodiments provided in this application, it should be understood that the disclosed system, device, and method may be implemented in other manners. For example, the described device embodiments are merely used as examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electrical, mechanical, or other forms The units described as separate components may or may not be physically separate, and components displayed as units may or may not be physical units. To be specific, the components may be located at one position, or may be distributed on a plurality of network units. Some or all of the units may be selected based on an actual requirement to achieve the objectives of the solutions in the embodiments.

In addition, functional units in the embodiments of this application may be integrated into one processing unit, or each of the units may exist alone physically, or two or more units are integrated into one unit.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An information determining method, comprising:
receiving indication information from a network device; and
determining a transmission manner of transmitting same transport block by using a plurality of transmission configuration indicator states (TCI-states), wherein the determining the transmission manner comprises:
when the indication information indicates two TCI-states, and the indication information indicates that a quantity of consecutive transmissions of the same transport block is greater than 1, determining that the transmission manner is separately transmitting the same transport block by using the two TCI-states at different time; or
when the indication information indicates two TCI-states, and the indication information does not indicate the quantity of consecutive transmissions of the same transport block, determining that the transmission manner is simultaneously transmitting the same transport block by using the two TCI-states, wherein each of the two TCI-states corresponds to one code division multiplexing (CDM) group of demodulation reference signal (DMRS) port.

2. The method according to claim 1, wherein
a first TCI-state of the two TCI states corresponds to one CDM group in which a DMRS port with a minimum index is located, and a second TCI-state of the two TCI states corresponds to the other CDM group of DMRS port.

3. A communications apparatus, comprising:
at least one processor coupled to one or more memories that store programming instructions for execution by the at least one processor to:
receive indication information from a network device; and
determine a transmission manner of transmitting same transport block by using a plurality of transmission configuration indicator states (TCI-states), wherein the determine the transmission manner comprises:
when the indication information indicates two TCI-states, and the indication information indicates that a quantity of consecutive transmissions of the same transport block is greater than 1, determine that the transmission manner is separately transmitting the same transport block by using the two TCI-states at different time; or
when the indication information indicates two TCI-states, and the indication information does not indicate the quantity of consecutive transmissions of the same transport block, determine that the transmission manner is simultaneously transmitting the same transport block by using the two TCI-states, wherein each of the two TCI-states corresponds to one code division multiplexing (CDM) group of demodulation reference signal (DMRS) port.

4. The communications apparatus according to claim 3, wherein
a first TCI-state of the two TCI states corresponds to one CDM group in which a DMRS port with a minimum index is located, and a second TCI-state of the two TCI states corresponds to the other CDM group of DMRS port.

5. A method, comprising:

sending indication information to a terminal device; and when the indication information indicates two transmission configuration indicator states (TCI-states), and the indication information indicates that a quantity of consecutive transmissions of the same transport block is greater than 1, transmitting the same transport block by using the two TCI-states at different time; or when the indication information indicates two TCI-states, and the indication information does not indicate the quantity of consecutive transmissions of the same transport block, transmitting the same transport block by using the two TCI-states simultaneously, wherein each of the two TCI-states corresponds to one code division multiplexing (CDM) group of demodulation reference signal (DMRS) port.

6. The method according to claim 5, wherein a first TCI-state of the two TCI states corresponds to one CDM group in which a DMRS port with a minimum index is located, and a second TCI-state of the two TCI states corresponds to the other CDM group of DMRS port.

7. An apparatus, comprising:

at least one processor coupled to one or more memories that store programming instructions for execution by the at least one processor to:

send indication information to a terminal device; and when the indication information indicates two transmission configuration indicator states (TCI-states), and the indication information indicates that a quantity of consecutive transmissions of the same transport block is greater than 1, transmit the same transport block by using the two TCI-states at different time; or when the indication information indicates two TCI-states, and the indication information does not indicate the quantity of consecutive transmissions of the same transport block, transmit the same transport block by using the two TCI-states simultaneously, wherein each of the two TCI-states corresponds to one code division multiplexing (CDM) group of demodulation reference signal (DMRS) port.

8. The apparatus according to claim 7, wherein a first TCI-state of the two TCI states corresponds to one CDM group in which a DMRS port with a minimum index is located, and a second TCI-state of the two TCI states corresponds to the other CDM group of DMRS port.

* * * * *